(12) United States Patent
Ziegler

(10) Patent No.: US 10,807,807 B2
(45) Date of Patent: Oct. 20, 2020

(54) METHOD AND SYSTEM FOR ARRANGING ARTICLES

(71) Applicant: Graphic Packaging International, LLC, Atlanta, GA (US)

(72) Inventor: Kelly W. Ziegler, Crosby, MN (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 16/568,687

(22) Filed: Sep. 12, 2019

(65) Prior Publication Data

US 2020/0087078 A1 Mar. 19, 2020

Related U.S. Application Data

(60) Provisional application No. 62/731,340, filed on Sep. 14, 2018, provisional application No. 62/878,992, filed on Jul. 26, 2019.

(51) Int. Cl.
    *B65G 47/28* (2006.01)
    *B65B 35/30* (2006.01)

(52) U.S. Cl.
    CPC .............. *B65G 47/28* (2013.01); *B65B 35/30* (2013.01)

(58) Field of Classification Search
    None
    See application file for complete search history.

(56) References Cited

U.S. PATENT DOCUMENTS

| | | | |
|---|---|---|---|
| 2,678,151 A | 5/1954 | Geisler | |
| 3,007,293 A | 11/1961 | McGihon | |
| 3,022,615 A | 2/1962 | Schroeder | |
| 3,139,714 A | 7/1964 | Hall | |
| 3,778,959 A | 12/1973 | Langen | |
| 3,815,316 A | 6/1974 | Brooke | |
| 3,956,868 A | 5/1976 | Ganz | |
| 4,002,005 A * | 1/1977 | Mueller | B65B 9/02 53/442 |
| 4,067,433 A * | 1/1978 | Phipps | B65B 35/56 198/374 |

(Continued)

FOREIGN PATENT DOCUMENTS

| | | |
|---|---|---|
| EP | 0 552 981 | 7/1993 |
| EP | 1 210 270 B1 | 7/2003 |

(Continued)

OTHER PUBLICATIONS

International Search Report and Written Opinion for PCT/US2019/050756 dated Jan. 9, 2020.

*Primary Examiner* — William R Harp
(74) *Attorney, Agent, or Firm* — Womble Bond Dickinson (US) LLP

(57) ABSTRACT

A method of arranging articles. The method can comprise moving a bucket in a machine direction on a conveyor assembly. The bucket can comprise a receiving space. The method further can comprise loading a plurality of articles into an arrangement of articles in the receiving space as the bucket moves in the machine direction. The arrangement of articles can comprise at least a first article and a second article of the plurality of articles. The method also can comprise elevating at least the first article with respect to the second article in the receiving space of the bucket, and compacting the arrangement of articles in the bucket.

37 Claims, 12 Drawing Sheets

(56) References Cited

U.S. PATENT DOCUMENTS

| | | |
|---|---|---|
| 4,250,693 A | 2/1981 | Andersson |
| 4,463,541 A | 8/1984 | Nowacki |
| 4,693,055 A | 9/1987 | Olsen |
| 4,756,139 A | 7/1988 | Le Bras |
| 4,887,414 A | 12/1989 | Arena |
| 4,962,625 A | 10/1990 | Johnson, Jr. |
| 4,982,551 A | 1/1991 | Nigrelli, Sr. |
| 5,027,586 A | 7/1991 | Ramaker |
| 5,052,544 A | 10/1991 | Anderson |
| 5,070,992 A | 12/1991 | Bonkowski |
| 5,241,806 A | 9/1993 | Ziegler et al. |
| 5,388,389 A | 2/1995 | Tisma |
| 5,456,058 A | 10/1995 | Ziegler |
| 5,477,655 A | 12/1995 | Hawley |
| 5,501,064 A | 3/1996 | Ingram |
| 5,502,950 A | 4/1996 | Moncrief |
| 5,546,734 A | 8/1996 | Moncrief et al. |
| 5,553,441 A | 9/1996 | Ivansco, Jr. et al. |
| 5,606,848 A | 3/1997 | Domino |
| 5,657,610 A | 8/1997 | Dietrich |
| 5,727,365 A | 3/1998 | Lashyro et al. |
| 5,758,474 A | 6/1998 | Ziegler |
| 5,771,658 A | 6/1998 | Olson et al. |
| 5,775,067 A | 7/1998 | Hawley |
| 5,809,746 A | 9/1998 | DePuy |
| 5,862,648 A | 1/1999 | Greenwell et al. |
| 5,896,728 A | 4/1999 | Domino |
| 6,058,679 A | 5/2000 | Ziegler |
| 6,105,338 A | 8/2000 | Kalany |
| 6,202,392 B1 | 3/2001 | Greenwell |
| 6,209,706 B1 | 4/2001 | Tod, Jr. |
| 6,279,301 B1 | 8/2001 | Corniani et al. |
| 6,308,502 B1 | 10/2001 | Olson et al. |
| 6,446,416 B1 | 9/2002 | Kuhn et al. |
| 6,711,878 B1 | 3/2004 | Paselsky et al. |
| 6,907,979 B2 | 6/2005 | Ford et al. |
| 7,073,656 B2 | 7/2006 | Gust et al. |
| 7,104,027 B2 | 9/2006 | Ford et al. |
| 7,146,784 B1 | 12/2006 | Portrait |
| 7,240,467 B2 | 7/2007 | Moncrief et al. |
| 7,273,343 B2 | 9/2007 | Ziegler |
| 7,316,103 B2 | 1/2008 | Ford |
| 7,392,894 B2 | 7/2008 | Jacob |
| 7,395,915 B2 | 7/2008 | Culpepper |
| 7,503,157 B2 | 3/2009 | Ford |
| 7,503,447 B2 | 3/2009 | Ford |
| 7,533,768 B2 | 5/2009 | Floding et al. |
| 7,637,083 B2 | 12/2009 | Moncrief et al. |
| 7,726,464 B2 | 6/2010 | Cerf |
| 7,832,186 B2 | 11/2010 | Moncrief et al. |
| 8,015,776 B2 | 9/2011 | Alfonso et al. |
| 8,074,430 B2 | 12/2011 | Disrud |
| 8,235,201 B2 | 8/2012 | Miller et al. |
| 8,246,290 B2 | 8/2012 | May et al. |
| 8,458,874 B2 | 6/2013 | Ziegler |
| 8,596,446 B2 | 12/2013 | Biggel et al. |
| 8,646,592 B1 | 2/2014 | Liao |
| 8,695,781 B2 | 4/2014 | Mougin et al. |
| 9,205,939 B2 | 12/2015 | Disrud et al. |
| 9,233,769 B2 | 1/2016 | Disrud et al. |
| 9,238,558 B2 | 1/2016 | Houck et al. |
| 9,346,573 B2 | 5/2016 | Disrud et al. |
| 9,346,574 B2 | 5/2016 | Disrud et al. |
| 9,623,522 B2 | 4/2017 | Ziegler |
| 9,776,750 B2 | 10/2017 | May et al. |
| 10,245,687 B2 | 4/2019 | Ziegler |
| 10,399,719 B2 | 9/2019 | Disrud et al. |
| 10,399,796 B2 * | 9/2019 | Bellante .................. B65B 35/58 |
| 10,421,572 B2 | 9/2019 | Moncrief et al. |
| 2007/0277480 A1 | 12/2007 | Ford |
| 2008/0000753 A1 | 1/2008 | Patterson |
| 2008/0011581 A1 | 1/2008 | Ford |
| 2008/0104933 A1 | 5/2008 | Flagg |
| 2010/0018156 A1 | 1/2010 | Ford |
| 2010/0162668 A1 | 7/2010 | Cain |
| 2011/0173930 A1 | 7/2011 | Poutot |
| 2011/0173931 A1 | 7/2011 | Ford |
| 2012/0096808 A1 | 4/2012 | Poutot |
| 2013/0097974 A1 | 4/2013 | Disrud et al. |
| 2014/0061000 A1 | 3/2014 | Ford |
| 2015/0329231 A1 | 11/2015 | Moncrief |

FOREIGN PATENT DOCUMENTS

| | | |
|---|---|---|
| JP | 53-102188 | 9/1978 |
| JP | 9-500347 | 1/1997 |
| JP | 9-507460 | 7/1997 |
| JP | 2007-217020 A | 8/2007 |
| JP | 2009-543743 | 12/2009 |
| JP | 2011-526869 | 10/2011 |
| WO | WO 94/20368 | 9/1994 |
| WO | WO 97/46450 | 12/1997 |
| WO | WO 2014/172409 | 10/2014 |

\* cited by examiner

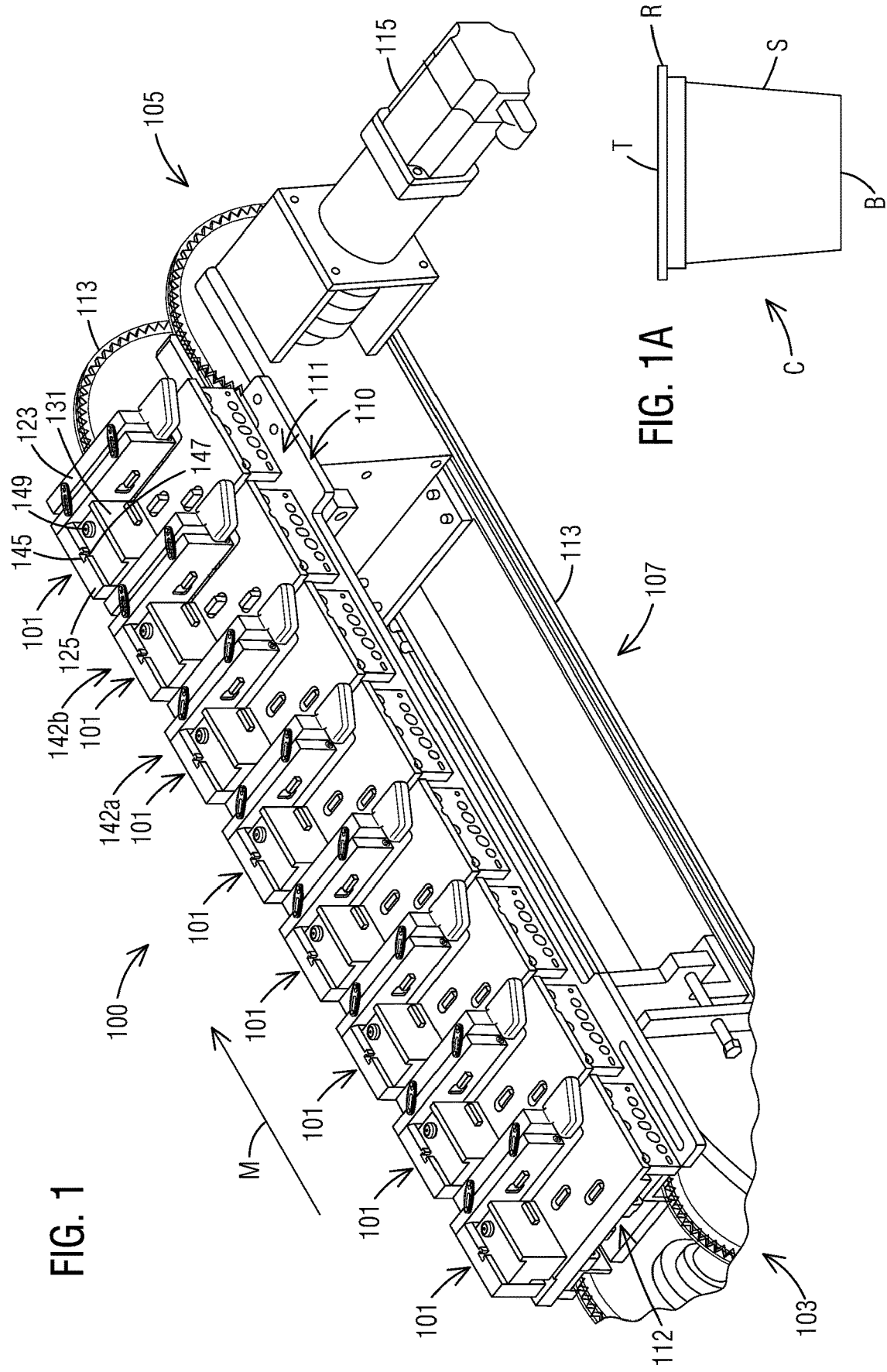

METHOD AND SYSTEM FOR ARRANGING ARTICLES

CROSS-REFERENCE TO RELATED APPLICATIONS

This application claims the benefit of U.S. Provisional Patent Application No. 62/731,340, filed on Sep. 14, 2018, and U.S. Provisional Patent Application No. 62/878,992, filed on Jul. 26, 2019.

INCORPORATION BY REFERENCE

The disclosures of U.S. Provisional Patent Application No. 62/731,340, filed on Sep. 14, 2018, and U.S. Provisional Patent Application No. 62/878,992, filed on Jul. 26, 2019, are hereby incorporated by reference for all purposes as if presented herein in their entirety.

BACKGROUND OF THE DISCLOSURE

The present disclosure generally relates to systems and methods for arranging articles prior to loading the articles into cartons. More specifically, the present disclosure is directed to methods and systems for arranging the articles to be in a compact and reliable configuration.

SUMMARY OF THE DISCLOSURE

In general, one aspect of the disclosure is directed to a method of arranging articles. The method can comprise moving a bucket in a machine direction on a conveyor assembly. The bucket can comprise a receiving space. The method further can comprise loading a plurality of articles into an arrangement of articles in the receiving space as the bucket moves in the machine direction. The arrangement of articles can comprise at least a first article and a second article of the plurality of articles. The method also can comprise elevating at least the first article with respect to the second article in the receiving space of the bucket, and compacting the arrangement of articles in the bucket.

In another aspect, the disclosure is generally directed to a system for arranging articles. The system can comprise a bucket mounted on a conveyor assembly. The conveyor assembly can move the bucket in a machine direction, and the bucket can comprise a receiving space. An article conveyor can load a plurality of articles in an arrangement of articles in the bucket on the conveyor assembly. At least one finger can be mounted on the bucket for elevating at least one article of the plurality of articles in the arrangement of articles. A translation plate can be mounted on the bucket for compacting the arrangement of articles in the bucket.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

FIG. 1 is a schematic perspective view of a system with a plurality of buckets for arranging articles according to a first exemplary embodiment of the disclosure.

FIG. 1A is a schematic elevation view of an article for being arranged by the system of FIG. 1 according to the first exemplary embodiment of the disclosure.

Corresponding parts are designated by corresponding reference numbers throughout the drawings.

DETAILED DESCRIPTION OF THE EXEMPLARY EMBODIMENTS

Figure 2A:
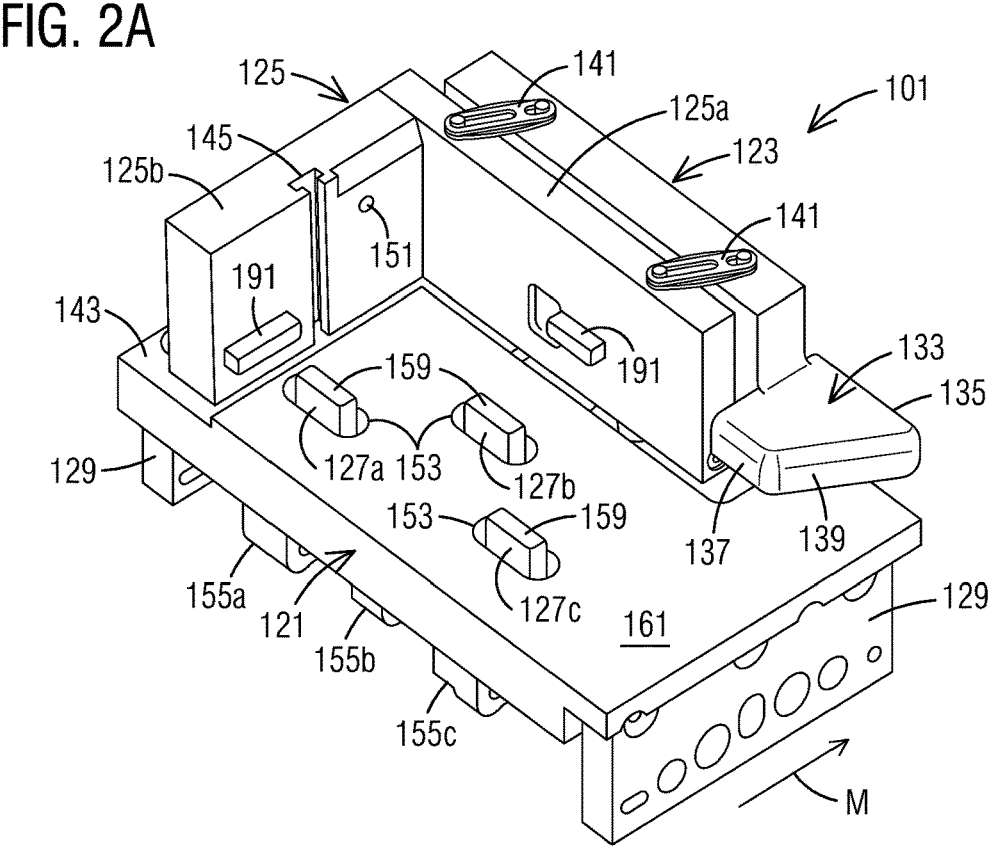
FIGS. 2A and 2B are schematic perspective views of one of the buckets of FIG. 1.

The present disclosure generally relates to a system and method of arranging articles prior to loading the articles into cartons. The system according to the present disclosure can accommodate articles of any shape. The articles can be containers, bottles, cans, etc. The articles can be used for packaging food and beverage products, for example. The articles can be made from materials suitable in composition for packaging the particular food or beverage item, and the materials include, but are not limited to, aluminum and/or other metals; glass; plastics such as PET, LDPE, LLDPE, HDPE, PP, PS, PVC, EVOH, and Nylon; and the like, or any combination thereof.

FIGS. 1-11 generally illustrate an example embodiment of a system and method 100 for arranging articles or containers C for being loaded into cartons (not shown) in accordance with the disclosure. In one embodiment, the system 100 can be included in a continuous packaging machine for packaging the articles C for storage, shipping, and/or sale. For example, the packaging machine can continuously, substantially continuously, or intermittently (e.g., indexed) feed articles C to the system 100, which arranges the articles C as described below, and then transfers the arranged articles C to a carton (not shown), wherein the carton and the articles form a package. In the illustrated embodiment, the articles C (e.g., as shown in FIGS. 1A, 3, 4, and 5) can be in the form of tubs or cups having tapered sides S so that the cups are narrower at their bottoms B than at their tops T. The top T of each article C can have a rim R and a lid L (e.g., a foil or other suitable lid) that can seal the top T at the rim R. In one exemplary embodiment, the articles C can be for containing a product for brewing a beverage (e.g., coffee, tea, cocoa, etc.) in a brewing system (e.g., K-Cup pods for single-cup and/or multi-cup brewing systems available from Keurig of Burlington, Mass., or other suitable containers and systems).

In the illustrated embodiment, the packaging system 100 moves the articles C into a plurality of buckets 101 (FIGS. 1, 2A, and 2B) moving from an upstream end 103 to a downstream end 105 generally in a machine direction M (e.g., the downstream direction) on a conveyor assembly 107. In one embodiment, the articles C can be loaded into the buckets 101 via an article conveyor 109 (FIGS. 3 and 4) so that the articles C alternate between foil up (e.g., upside-up with the top T and lid L facing upwardly and the rim R positioned above the bottom B) and foil down (e.g., upside-down with the top T and lid L facing down and the bottom B positioned above the rim R). As the buckets 101 continue to move in the machine direction M on the conveyor assembly 107, the buckets 101 can interact with an actuating cam assembly 111, which can actuate the buckets 101 to at least partially arrange the articles C to be in a more compact configuration. In one embodiment, the articles C can be removed from the bucket 101 in the compact configuration by a robot arm (not shown) or other suitable apparatus and loaded into a carton (not shown). Subsequently, the buckets 101 can be returned to the upstream end 103 by the conveyor assembly 107 where the buckets can interact with a reset cam assembly 112 that can prepare the buckets 101 for receiving the articles C. In one embodiment, the actuating cam assembly 111 and the reset cam assembly can be mounted to respective downstream and upstream ends of a cam base plate 110 (FIGS. 1 and 6-11).

As illustrated in FIG. 1, the buckets 101 are mounted to two belts or chains 113 of the conveyor assembly 107, which carries the buckets 101 in the machine direction M on top of the conveyor assembly 107 and returns the buckets 101 from the downstream end 105 to the upstream end 103 on an underside of the conveyor assembly 107 in an endless loop. In one embodiment, the conveyor assembly 107 can include a motor 115 or other suitable apparatus for moving the chains 113. While FIG. 1 shows buckets 101 only on the top side of the conveyor assembly 107, the system 100 can include buckets 101 mounted along the entire conveyor assembly 107. The conveyor assembly 107 could be otherwise shaped, positioned, arranged, and/or configured without departing from the disclosure.

As shown in FIG. 2A, the bucket 101 can include a base 121 (e.g., a base plate), a sidewall 123, a translation plate 125, and a plurality of fingers 127a, 127b, 127c. In addition, brackets 129 can be secured (e.g., bolted) to the base 121 and can extend downwardly from the base 121 for being secured (e.g., bolted) to the chains 113 of the conveyor assembly 107 (FIG. 1). As shown in FIGS. 2A, 3-7, and 11, the bucket 101 is configured for receiving six articles C in a single layer in a 2×3 arrangement, but it is understood that the bucket 101 may be sized and shaped to hold articles of a different or same quantity in more than one layer and/or in different row/column arrangements (e.g., 1×6, 3×4, 2×6, 4×6, 3×8, 2×6×2, 3×4×2, 2×9, 3×6, etc.). In one example embodiment, as shown in FIGS. 1 and 2B, the bucket 101 can receive a spacer insert 131 that can engage the translation plate 125, as described in more detail below, so that the bucket 101 is configured to receive four articles in a 2×2 arrangement when the spacer insert 129 is included.

Figure 3:
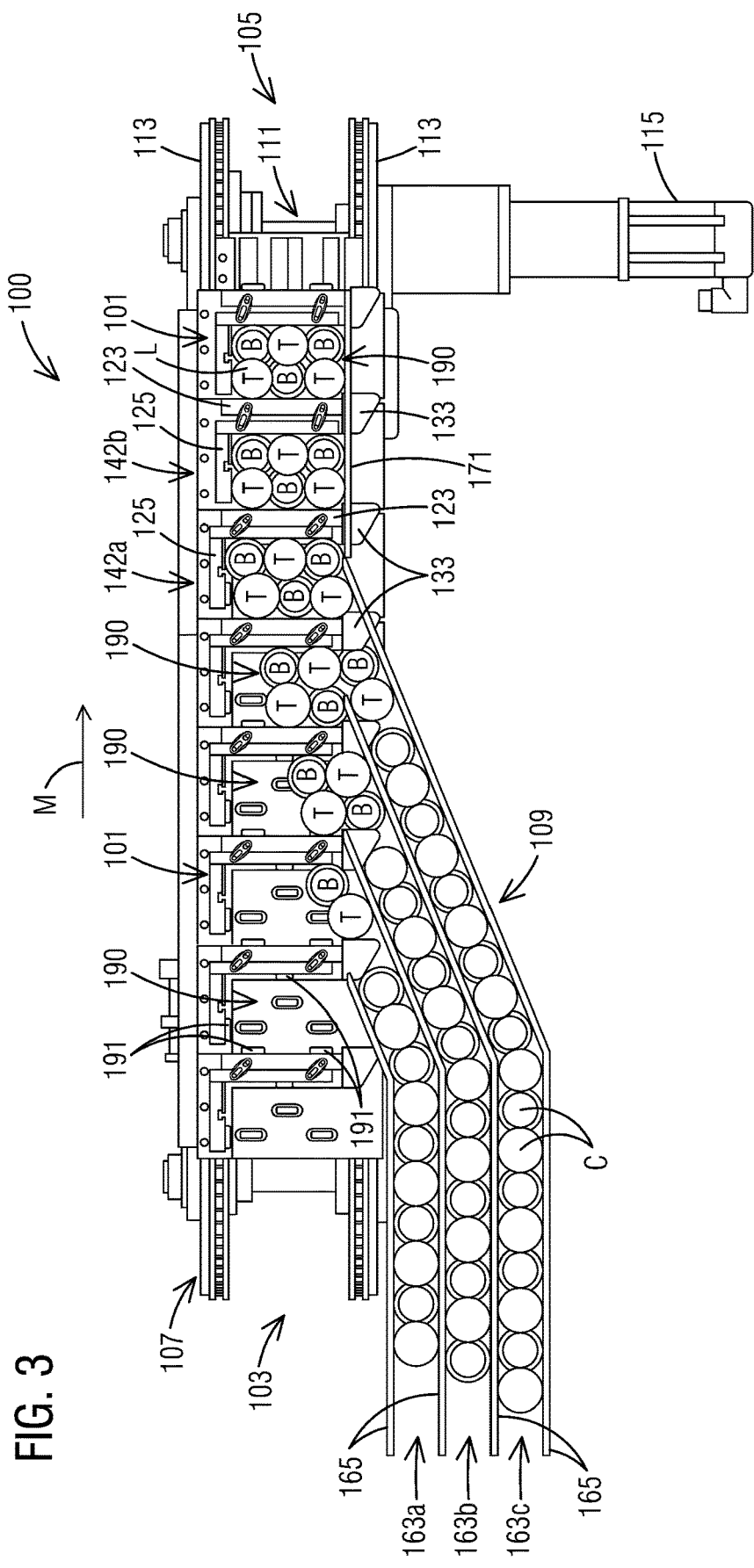
FIG. 3 is a schematic plan view of the system of FIG. 1 showing articles being loaded into the buckets according to the first exemplary embodiment of the disclosure.
Figure 4:
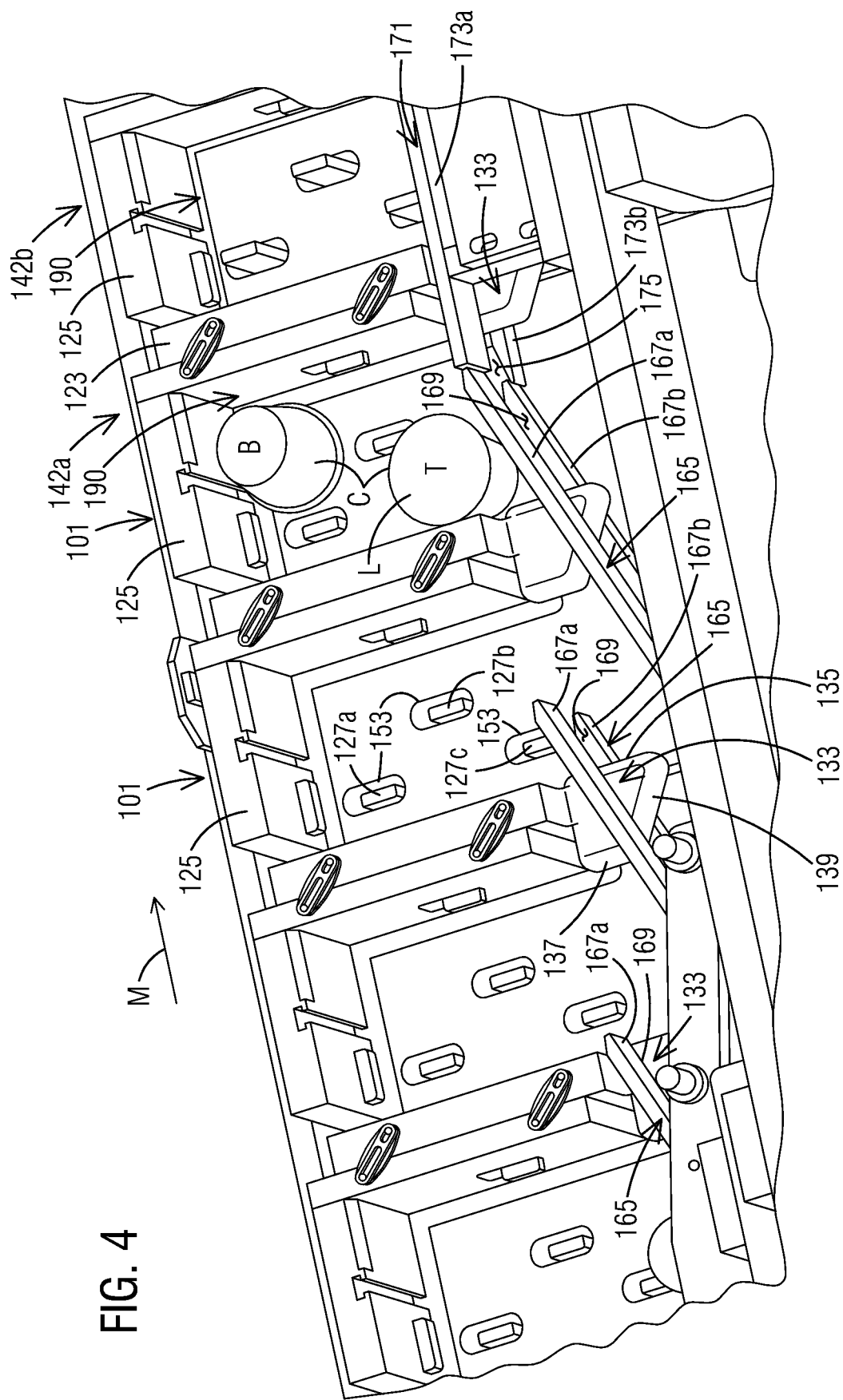
FIG. 4 is a schematic perspective view of a portion of the system of FIGS. 1 and 2.

As shown in FIG. 2A, the sidewall 123 can extend upwardly from the base 121 on a downstream side of the bucket 101. In one embodiment, the sidewall 123 can be secured (e.g., bolted) to the base 121. In the illustrated embodiment, a wedge 133 can extend from the sidewall 123 (e.g., on a loading or article-receiving side of the bucket 101) and can have a generally orthogonal downstream side 135, a generally orthogonal upstream side 137, and an oblique side 139 extending between the sides 135, 137. In one exemplary embodiment, the orthogonal sides 135, 137 can extend transverse to the machine direction M. As shown in FIG. 2A, the wedge 133 is located on the sidewall 123 so that it is spaced from the base 121. Accordingly, the wedge 133 can extend between guides of the article conveyor 109 and downstream guide rails as shown in FIGS. 3 and 4 and as described in more detail below. Generally the wedge 133 can help engage articles C as they are loaded into the bucket 101 and guide the engaged articles C onto the base 121.

In the illustrated embodiment, the translation plate 125 can be positioned on the base 121 and can be connected to the sidewall 123 by a hinge such as pivot arms 141, which can include two pivot arms 141 at the tops of the translation plate 125 and the sidewall 123 (FIGS. 1-7 and 11) and a pivot arm 141 at the bases of the translation plate 125 and the sidewall 123 (FIGS. 5-7 and 11). In one embodiment, the translation plate 125 can be in the form of an L-shaped plate and can be movable in a depression 143 of the base 121. In the illustrated embodiment, the translation plate 125 can include a first portion 125a that extends in a transverse direction that is perpendicular to the machine direction M and a second portion 125b that extends in the machine direction M (FIGS. 2A and 2B). As shown in FIGS. 5-7A and 11, a cam follower 144 can be mounted to an extension 146 extending downwardly from the translation plate 125 through an opening or slot (not shown) in the base 121. The cam follower 144 can be configured to interact with the actuating cam assembly 111 and the reset cam assembly 112 as described in more detail below. In the illustrated embodiment, the translation plate 125 can move (e.g., due to the interaction between the cam follower 144 and the actuating cam assembly 111) on the pivot arms 141 from an initial configuration 142a (e.g., a loading configuration) to a secondary configuration 142b (e.g., a compacting configuration) (FIGS. 1 and 3). In the illustrated embodiment, the translation plate 125 can be retained in the loading configuration 142a against the sidewall 123 by the interaction between the cam follower 144 and the reset cam assembly 112 as described in more detail below or by any other suitable feature. In an alternative embodiment, the translation plate 125 can be biased toward the loading configuration 142a against the sidewall 123 by springs (e.g., associated with the pivot arms 141) or any other suitable feature. In the compacting configuration 142b, the translation plate 125 can be moved away from the sidewall 123 (e.g., in the upstream direction) and toward the loading side of the bucket 101 (e.g., in the transverse direction) in order to compact the articles C in the bucket 101 as discussed in more detail below.

Figure 2B:
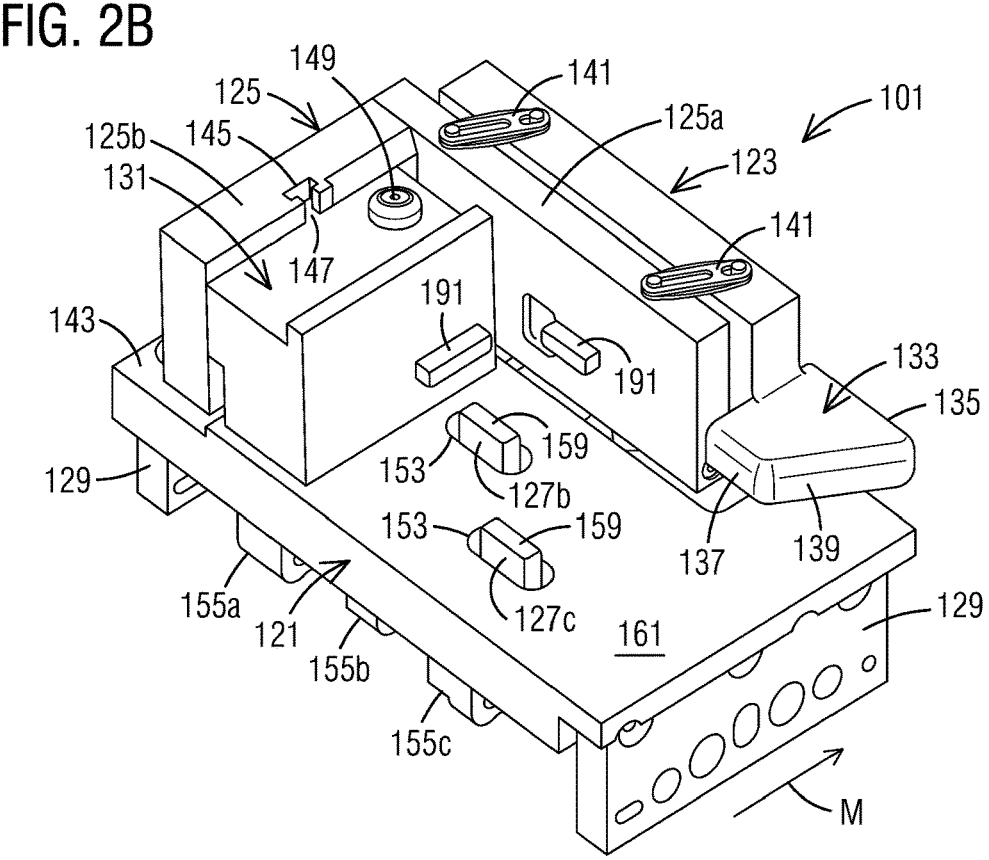

As shown in FIGS. 2A and 2B, the translation plate 125 can include a slot or groove 145 that can be vertically oriented and that can receive a tongue 147 of the spacer insert 131 to help retain the spacer insert 131 against the translation plate 125. The spacer insert 131 can further include a fastener that engages a bore 151 in the translation plate 125 for further securing the spacer insert 131 to the translation plate 125. In one embodiment, the fastener can include a biased pin (not shown) that can be biased toward engagement with the bore 151 (FIG. 2A) by a spring (not shown) in the interior of the spacer insert 131, and a locking pin 149 can be inserted into a bore (not shown) in the top of the spacer insert 131 to engage the bias pin and retain the bias pin in engagement with the bore 151. Alternatively, a thumb screw or other suitable fastener can engage the bore 151 (e.g., an internally-threaded bore) and/or a bore in the base 121. In one embodiment, the spacer insert 131 can be configured to take the space of one row of articles C, covering one of the fingers (e.g., finger 127*a*), so that the bucket 101 is configured for receiving the articles C in a 2×2 arrangement when the spacer insert 131 is used.

Figure 5:
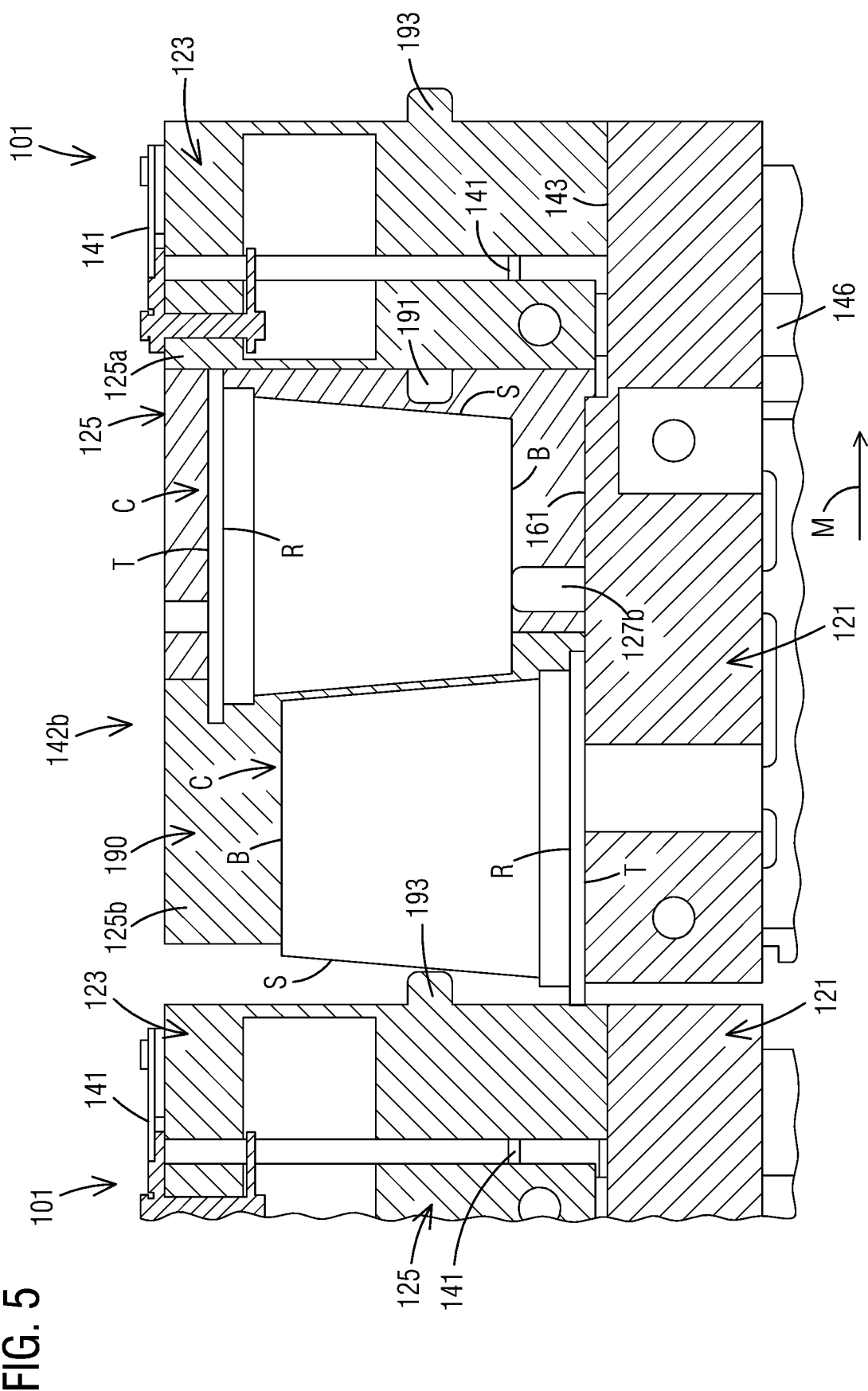
FIG. 5 is a schematic cross-sectional view of the bucket of FIG. 3 and a portion of an adjacent bucket defining an interior space showing the arranged articles according to the first exemplary embodiment of the disclosure.
Figure 6:
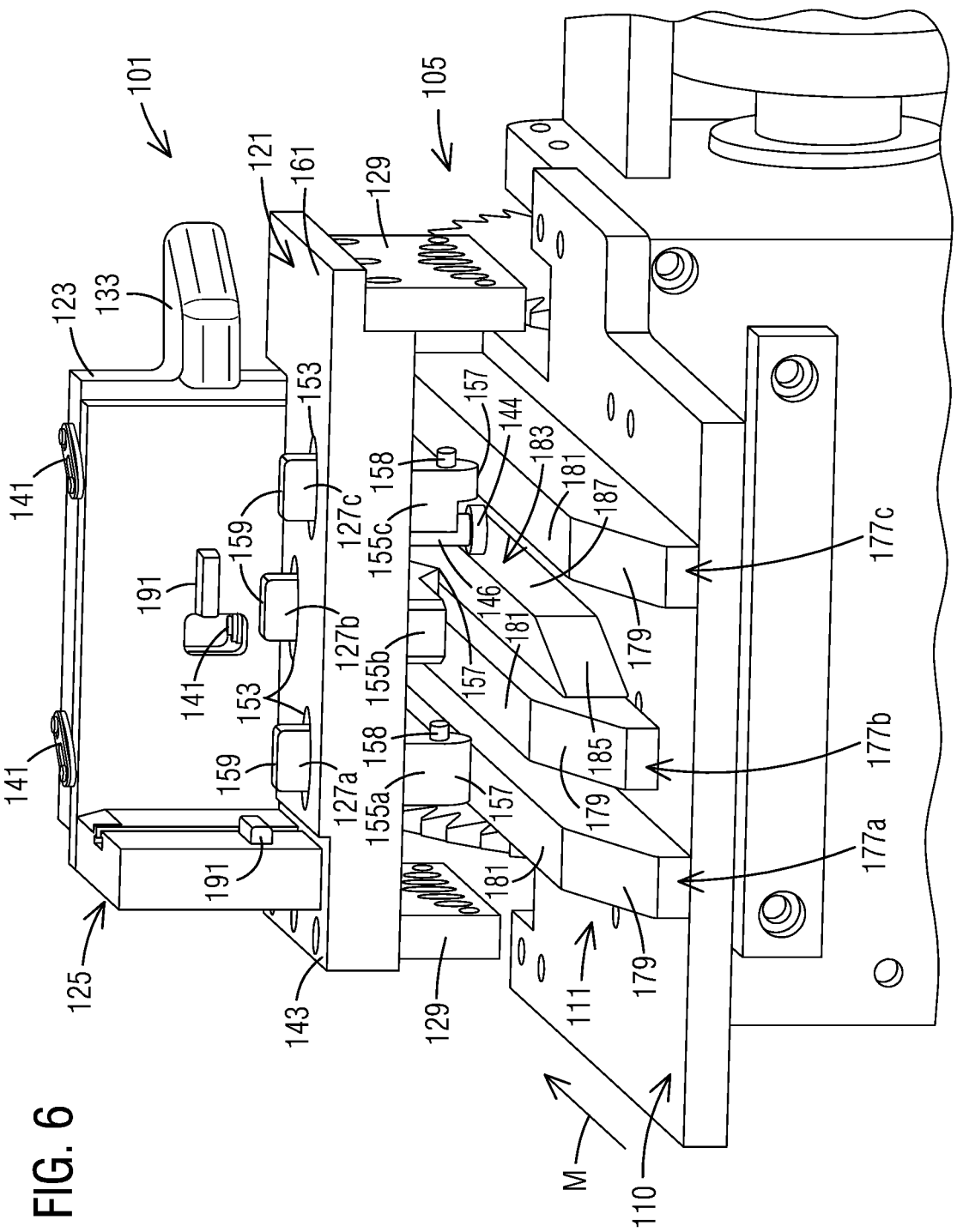
FIG. 6 is a schematic perspective view of a downstream portion of the system of FIG. 1.
Figure 7:
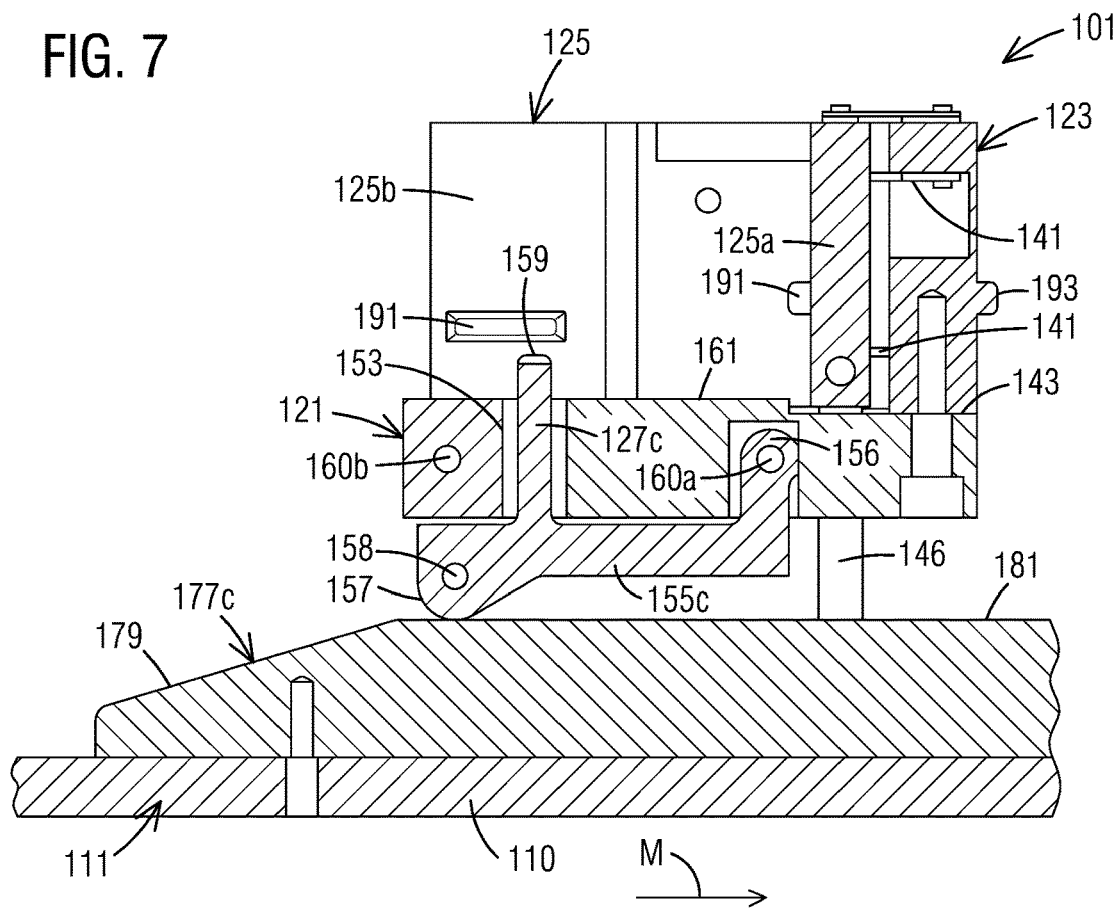
FIG. 7 is a schematic cross-sectional view of the downstream portion of the system of FIG. 6.
Figure 7A:
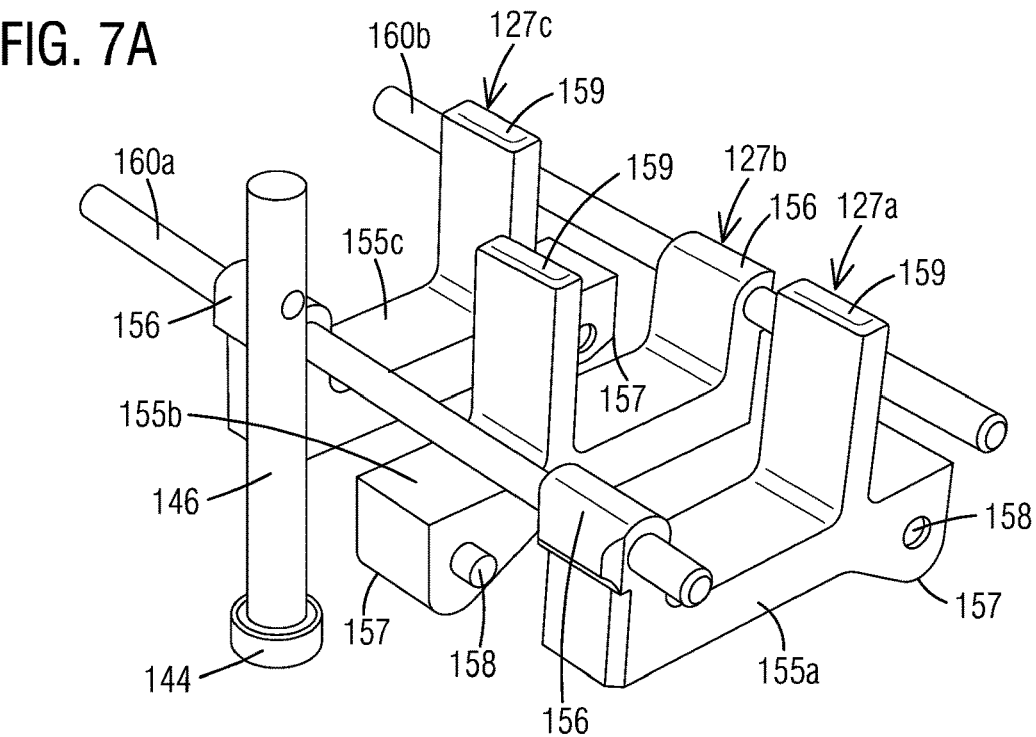
FIG. 7A is a schematic perspective view of the cam following features of the bucket of FIG. 2A.

As shown in FIGS. 2A, 4, 6, and 7, each of the fingers 127*a*, 127*b*, 127*c* can be received in respective slots 153 in the base 121. As shown in FIGS. 7 and 7A, each of the fingers 127*a*, 127*b*, 127*c* can have a respective base arm 155*a*, 155*b*, 155*c* that is pivotably mounted to the base 121 at a pivot point 156 at an end of the base arm 155*a*, 155*b*, 155*c*. In one embodiment, the base arms 155*a* and 155*c* can pivot on an axle 160*a* at a downstream end of the base arms and the base arm 155*b* can pivot on an axle 160*b* at an upstream end of the base arm (FIGS. 7 and 7A). As shown in FIGS. 6-7A, each of the base arms 155*a*, 155*b*, 155*c* can include a downward protrusion 157 and a projection 158 for interacting with the cam assemblies 111, 112 as described in more detail below. In the illustrated embodiment, the base arm 155*a*, 155*b*, 155*c* of each finger 127*a*, 127*b*, 127*c* can pivot about its pivot point 156 from an initial configuration (e.g., a retracted configuration), wherein the top end 159 of each finger 127*a*, 127*b*, 127*c* is disposed in the respective slot 153 below the support surface 161 of the base 121 (FIGS. 1 and 4), to a secondary configuration (e.g., an elevated configuration), wherein the top end 159 extends above the support surface 161 of the base 121 (FIGS. 1-2B, 4-7 and 11).

The buckets 101 could be otherwise shaped, positioned, arranged, and/or configured without departing from the disclosure.

As shown in FIG. 3, the article conveyor 109 can include a belt conveyor or other suitable apparatus for moving the articles C toward the loading side of the buckets 101 in a plurality of lanes 163*a*, 163*b*, 163*c*. In one embodiment, the article conveyor 109 includes three lanes 163*a*, 163*b*, 163*c* for a bucket 101 configured to receive three rows of articles C (e.g., in a 2×3 arrangement). Accordingly, each lane 163*a*, 163*b*, 163*c* can provide one row of articles C. In an exemplary embodiment, one or more of the lanes can be deactivated (e.g., blocked) for buckets 101 configured to receive fewer rows of articles C. For example, the buckets 101 can include the spacer inserts 131 (FIG. 1) so that they are configured to receive two rows of articles C (e.g., in a 2×2 arrangement) and one of the lanes 163*a*, 163*b*, 163*c* could be deactivated. Alternatively, the article conveyor 109 could be reconfigured or replaced to include only two lanes for loading articles C in a 2×2 arrangement when the spacer inserts 131 are included. In other embodiments, the article conveyor could include more than three lanes and/or each lane could provide more than one row of articles to each bucket.

In the illustrated embodiment, the articles C are arranged in each lane 163*a*, 163*b*, 163*c* to alternate between foil up and foil down orientations. Since the buckets 101 are sized to receive two articles C in each row in the exemplary embodiment, each lane 163*a*, 163*b*, 163*c* can supply two articles C so that one is foil up and one is foil down (FIG. 3). In addition, each subsequent lane can be configured so that the orientations of the articles C are out of phase with the orientations of the articles of the prior, upstream lane. For example, the upstream lane 163*a* can load a foil down article C (the bottom B is visible in FIG. 3) followed by a foil up article C (the top T is visible in FIG. 3) for the first row, the next (intermediate) lane 163*b* can then load a foil up article C followed by a foil down article C for the second row, and the downstream lane 163*c* can then load a foil down article C followed by a foil up article C for the third row so that the articles C alternate between foil up and foil down orientations in each row and each column in each of the buckets 101. Further, in the illustrated embodiment, each of the slots 153 and the respective fingers 127*a*, 127*b*, 127*c* is aligned with (e.g., for abutting) the bottom B of a respective foil up article C when the articles C are fully loaded in the buckets 101. In an alternative embodiment, the fingers 127*a*, 127*b*, 127*c* could be aligned with foil down and/or foil up articles C.

In the illustrated embodiment, the article conveyor 109 includes a plurality of guides 165 that define the lanes (e.g., four guides 165 can define the three lanes 163*a*, 163*b*, 163*c*) and guide the articles C as they move along the lanes 163*a*, 163*b*, 163*c*. As shown in FIG. 4, at least the downstream ends of each of the guides 165 can include an upper portion 167*a* spaced from a lower portion 167*b* to provide a clearance gap 169 so that the wedges 133 can pass between the portions 167*a*, 167*b* in the gap 169 as the buckets 101 move past the guides 165. In one embodiment, the articles C can be moved on a conveyor belt (not shown) or any other suitable apparatus for moving the articles C along the guides 165 in the lanes 163*a*, 163*b*, 163*c*. As shown in FIGS. 3 and 4, a guide rail 171 can extend in the machine direction M from the article conveyor 109 for retaining the articles C in the buckets 101 as the buckets 101 move downstream from the article conveyor 109. In the illustrated embodiment, an upstream end of the guide rail 171 extends from a downstream end of the downstream guide 165 of the downstream lane 163*c*. In one embodiment, the guide rail 171 can include an upper portion 173*a*, and a lower portion 173*b* spaced apart by a gap 175 for providing clearance for the wedges 133 (FIG. 4). The article conveyor 109 and/or the guide rail 171 could be omitted or could be otherwise shaped, positioned, arranged, and/or configured without departing from the disclosure.

As shown in FIGS. 1, 3, 6, 7, and 8-10, the actuating cam assembly 111 is disposed on the cam base plate 110 proximate the downstream end 105 of the system 100 and is downstream from the article conveyor 109. As shown in FIG. 6, the actuating cam assembly 111 can include a plurality of actuating finger cam surfaces 177*a*, 177*b*, 177*c* for guiding the protrusions 157 of the respective fingers 127*a*, 127*b*, 127*c* from the retracted configuration to the elevated configuration (e.g., so that the tops 159 of the fingers 127*a*, 127*b*, 127*c* extend above the top surface 161 of the base 121). For example, each of the finger cam surfaces 177*a*, 177*b*, 177*c* can include an upstream sloped surface portion 179 and a horizontal surface portion 181 extending downstream from the sloped surface portion 179. The sloped surface portions 179 can gradually push the respective fingers 127*a*, 127*b*, 127*c* upwardly through the slots 153 by engaging the protrusions 157 and causing the base arms 155*a*, 155*b*, 155*c* to pivot about their pivot points 156. In the illustrated embodiment, the protrusions 157 can slide along the horizontal surface portions 181 of the respective finger cam surfaces 177*a*, 177*b*, 177*c* to maintain the fingers 127*a*, 127*b*, 127*c* in the elevated configuration. As shown in FIGS. 6 and 8-10, the central cam surface 177*b* can be offset in the machine direction M from the outer cam surfaces 177*a*, 177*c* so that the protrusions 157 of the respective fingers 127*a*, 127*b*, 127*c* engage the respective cam surfaces 177*a*, 177*b*, 177*c* to be moved to the elevated configuration at substantially the same time even though the protrusion 157 of the central finger 127*b* is located downstream from the protrusions 157 the outer fingers 127*a*, 127*c*. In the illustrated embodiment, the protrusions 157 have rounded surfaces for sliding along the cam surfaces. However, a cam follower (not shown) or other suitable feature could be mounted to each of the protrusions for rolling or otherwise moving along the cam surfaces 177*a*, 177*b*, 177*c*.

As shown in FIGS. 6 and 8-10, the actuating cam assembly 111 can include a translating cam surface 183 for engaging the cam follower 144 of the translation plate 125. In the illustrated embodiment, translating cam surface 183 can include a sloped surface portion 185 and a vertical surface portion 187 so that the cam follower 144 can engage the sloped surface portion 185 to gradually move the translation plate 125 via the extension 146 relative to the sidewall 123 and the base 121 on the pivot arms 141 to the compacting configuration 142*b* of the bucket 101. In one embodiment, the cam follower 144 can roll along the vertical surface portion 187 to maintain the translation plate 125 in the compacting configuration 142*b*. As shown in FIGS. 6 and 8-10, the translating cam surface 183 can be offset in the machine direction M from the finger cam surfaces 177*a*, 177*b*, 177*c* so that the translation plate 125 is moved to the compacting configuration 142*b* after the fingers 127*a*, 127*b*, 127*c* are moved to the elevated configuration.

In the illustrated embodiment, the cam surfaces 177*a*, 177*b*, 177*c*, 183 extend along blocks that are mounted to the cam base plate 110. As shown in FIGS. 6 and 8-10, the central finger cam surface 177*b* and the translating cam surface 183 are formed on the same block. The actuating cam assembly 111 could be otherwise shaped, positioned, arranged, and/or configured without departing from the disclosure. For example, any suitable number of cam surfaces could be formed on any suitable number of blocks. In another example, the one or more of the cam surfaces could be integrally formed with the cam base plate 110.

As shown in FIGS. 8-11, the reset cam assembly 112 is mounted at an upstream end of the cam base plate 110 and includes a plurality of reset cam surfaces 197*a*, 197*b*, 197*c* for moving the respective fingers 127*a*, 127*b*, 127*c* to the retracted configuration (e.g., so that the tops 159 of the fingers 127*a*, 127*b*, 127*c* are moved down into the slots 153 and do not extend above the top surface 161 of the base 121). In one embodiment, as a respective bucket 101 moves on the chains 113 from the underside of the conveyor assembly 107 along the upstream end 103 to move in the machine direction M on the upper side of the conveyor assembly 107, the fingers 127*a*, 127*b*, 127*c* can move to the retracted configuration due to gravity. In the case that gravity is insufficient to move one or more of the fingers to the retracted configuration (e.g., due to friction), the reset cam surfaces 197*a*, 197*b*, 197*c* can engage the respective fingers 127*a*, 127*b*, 127*c* to move them to the retracted configuration. As shown in FIGS. 8-11, each of the reset cam surfaces 197*a*, 197*b*, 197*c* can include a sloped surface 199 that is angled downwardly from the upstream end 103 (e.g., each of the sloped surfaces 199 is angled so that its highest point is upstream from its lowest point). Accordingly the sloped surfaces 199 can engage the fingers 127*a*, 127*b*, 127*c* (e.g., at respective projections 158 extending from the protrusions 157 of the respective fingers) and can gradually push the projections 158 downwardly as the bucket 101 moves in the machine direction M. In one embodiment, the downward urging of the sloped surfaces 199 on the projections 158 (FIG. 11) can cause the base arms 155*a*, 155*b*, 155*c* to pivot about their pivot points 156 and to move the tops 159 of the fingers downwardly into the slots 153. In the case that the fingers 127*a*, 127*b*, 127*c* are configured with cam followers (not shown) (e.g., wherein the projections 158 can be axles for the cam followers in one embodiment), the cam followers can engage the cam surfaces 199 as the bucket 101 moves in the machine direction M.

Figure 8:
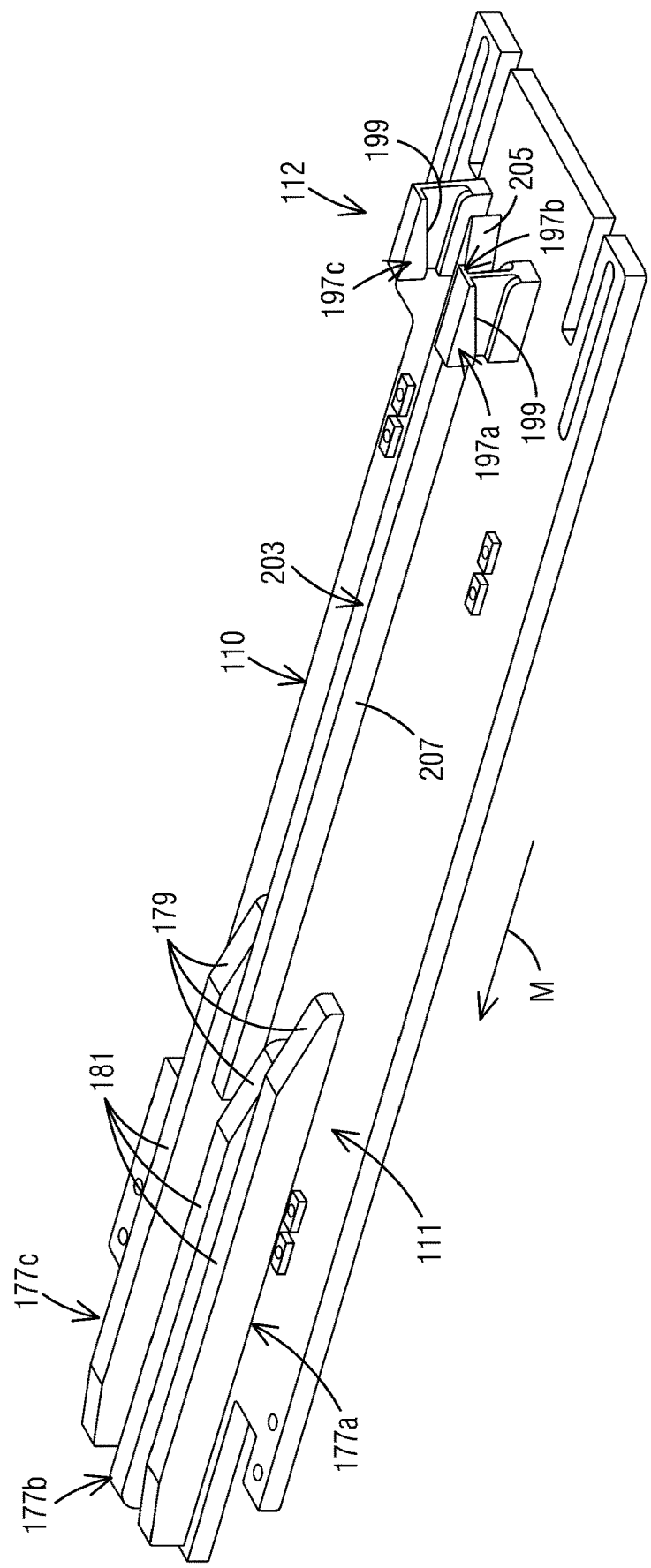
FIGS. 8 and 9 are schematic perspective views of a cam base plate of the system of FIG. 1 according to the first exemplary embodiment of the disclosure.
Figure 9:
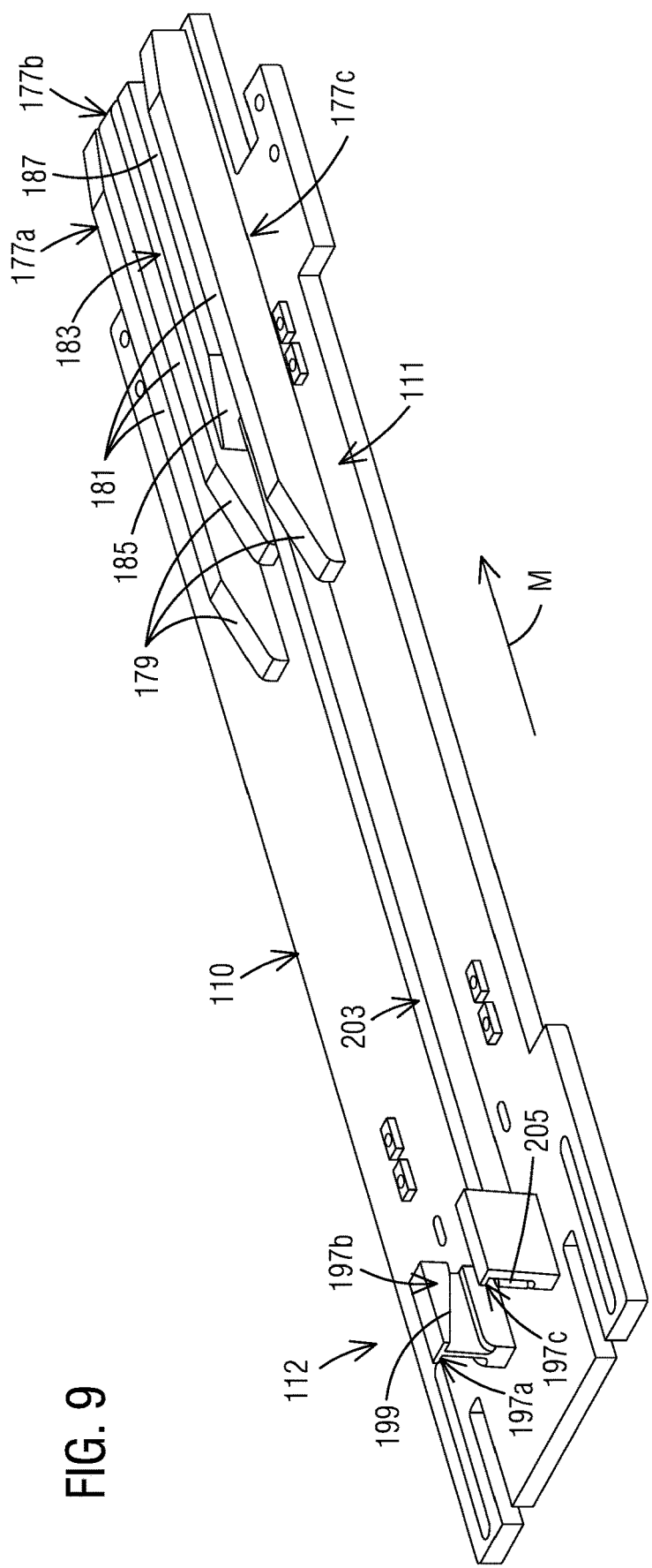
Figure 10:
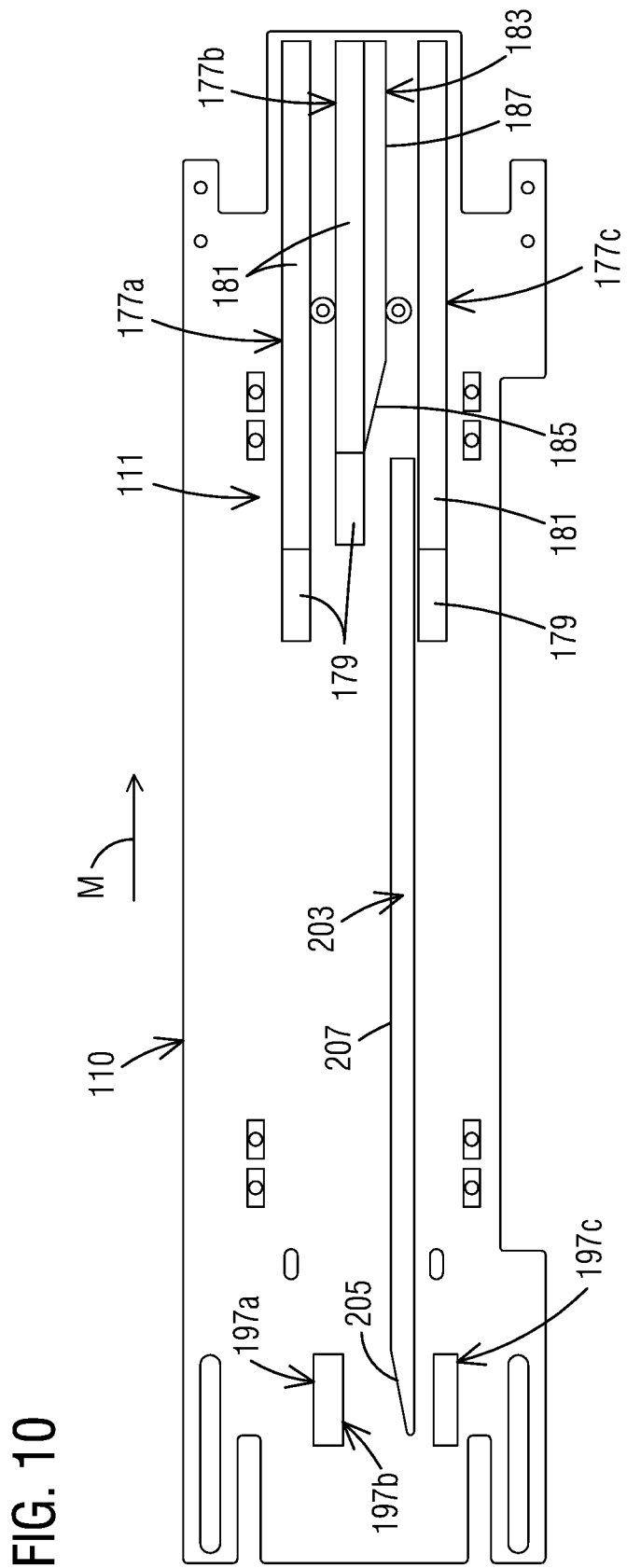
FIG. 10 is a schematic top view of the cam base plate of FIGS. 8 and 9.

As shown in FIGS. 8-11, the reset cam assembly 112 can include a transverse reset cam surface 203 for engaging the cam follower 144 of the translation plate 125 and moving the translation plate 125 to the loading configuration 142*a* of the bucket 101. In the illustrated embodiment, the transverse reset cam surface 203 can include a sloped surface portion 205 and a vertical surface portion 207 so that the cam follower 144 can engage the sloped surface portion 205 to gradually move the translation plate 125 via the extension 146 relative to the sidewall 123 and the base 121 on the pivot arms 141 to the loading configuration 142*a*. In one embodiment, the cam follower 144 can roll along the vertical surface portion 207 to maintain the translation plate 125 in the loading configuration 142*a*. As shown in FIG. 10, the transverse reset cam surface 203 can extend to a downstream end that is proximate to the upstream end of the translating cam surface 183 of the actuating cam assembly 111. Accordingly, the transverse reset cam surface 203 can maintain the translation plate 125 in the loading configuration 142*a* via the cam follower 144 and the extension 146 until the translating cam surface 183 engages the cam follower 144 and moves the translation plate 125 to the compacting configuration 142*b*.

In the illustrated embodiment, the cam surfaces 197*a*, 197*b*, 197*c*, 203 extend along blocks that are mounted to the cam base plate 110. As shown in FIGS. 8-10, the reset cam surfaces 197*a*, 197*b* are formed on the same block. The reset cam assembly 112 could be otherwise shaped, positioned, arranged, and/or configured without departing from the disclosure. For example, any suitable number of cam surfaces could be formed on any suitable number of blocks. In another example, the one or more of the cam surfaces could be integrally formed with the cam base plate 110. In another example, the reset cam assembly 112 could be spaced downstream from the upstream end 103 and configured to move the fingers and the translation plate to the loading configuration 142*a* prior to or when the articles C are loaded into the buckets 101. In an alternative embodiment, the reset cam assembly 112 could be omitted and the fingers 127*a*, 127*b*, 127*c* can be biased to the retracted configuration by springs or other suitable features and/or the translation plate 125 can be biased to the loading configuration by springs or other suitable features.

In the illustrated embodiment, the buckets 101 cooperate with one another to form an interior receiving space 190 that receives the articles C. As shown in FIGS. 1, 3, 4, and 5, the receiving space 190 can be defined by the base 121 and the translation plate 125 of one bucket 101 and the sidewall 123 of an adjacent bucket 101 that is upstream from the receiving space 190. As shown in FIGS. 3 and 4, the loading side of the buckets 101 can be at least partially closed by the guide rail 171 to further define the receiving space 190 as the buckets 101 move downstream from the article conveyor 109 after the articles C are loaded into the receiving space 190. In one embodiment, each of the buckets 101 can include two bumpers 191 on the translation plate 125 (FIGS. 2A-7) and two bumpers 193 on the downstream surface of the sidewall 123 (FIGS. 3, 5, and 7) so that the bumpers 191, 193 extend into the receiving space 190. Each of the bumpers 191, 193 can be aligned with the fingers 127a, 127b, 127c so that the bumpers 191, 193 can engage the foil up articles C in the receiving space 190. The receiving spaces 190 could be otherwise shaped, positioned, arranged, and/or configured without departing from the disclosure. For example, the bumpers 191, 193 could be configured to engage the foil up articles and/or the foil down articles.

Figure 11:
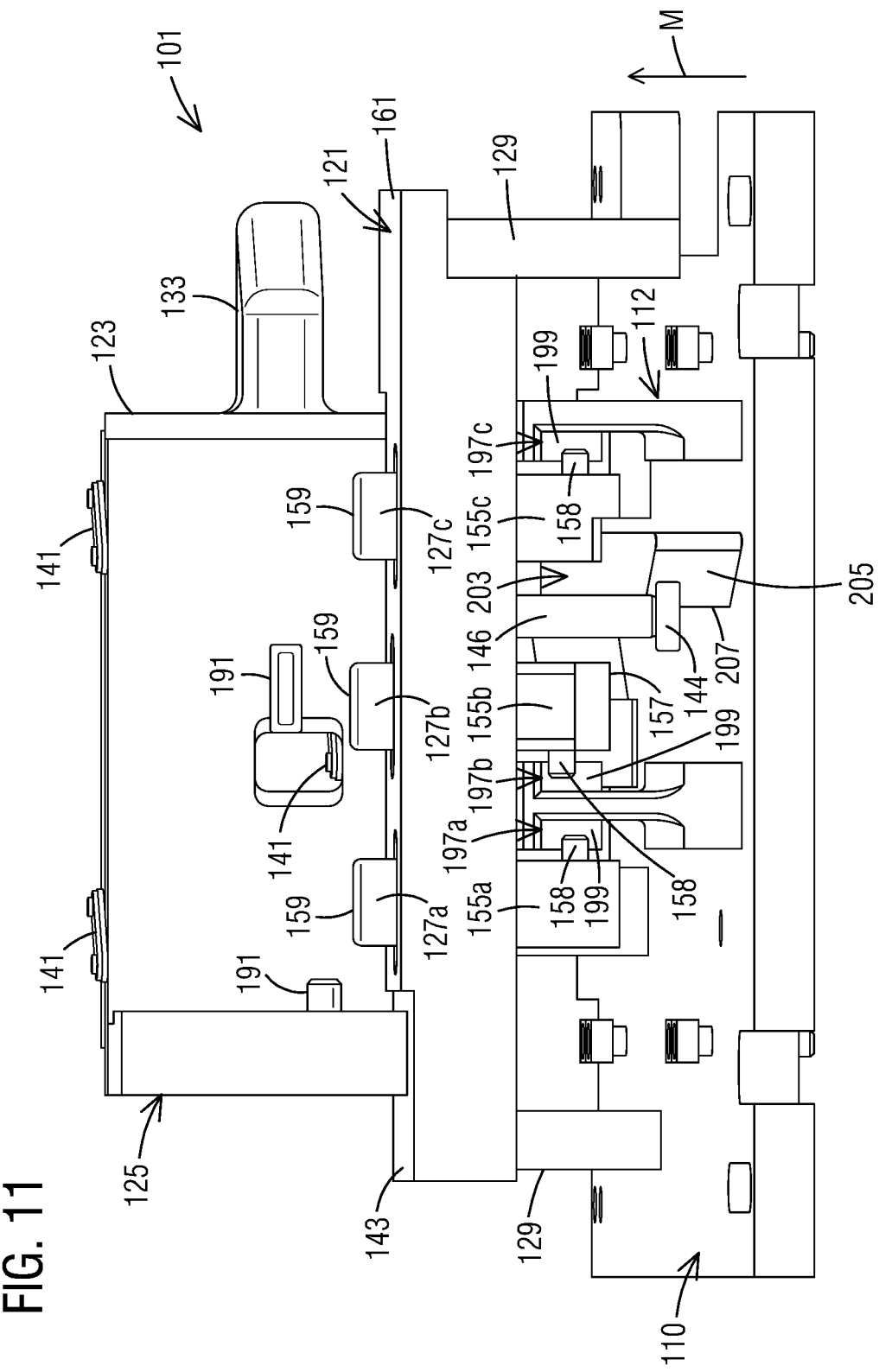
FIG. 11 is a schematic perspective end view of an upstream portion of the system of FIG. 1.

In operation, the buckets 101 can move in the machine direction M from the upstream end 103 so that adjacent buckets 101 are proximate one another (e.g., closely spaced from one another as shown in FIGS. 1, 3, and 5) and/or abut one another and so that the translation plate 125 and the sidewall 123 of the adjacent buckets form the receiving spaces 190. As shown in FIG. 11, as the buckets 101 move downstream from the upstream end 103 and engage the reset cam assembly 112, the projections 158 of the fingers 127a, 127b, 127c can engage the respective cam surfaces 197a, 197b, 197c to move the fingers 127a, 127b, 127c into the retracted configuration, and the cam follower 144 can engage the cam surface 203 to move the translation plate 125 to the loading configuration 142a. In one embodiment, with the fingers 127a, 127b, 127c in the retracted configuration, the translation plate 125 in the loading configuration 142a, and the buckets 101 positioned relative one another to form the receiving spaces 190, the buckets 101 are prepared to receive the articles C. As shown in FIGS. 3 and 4, the wedge 133 of a bucket 101 can move into the lane 163a to engage a foil down article C at its oblique surface 139 and the side 135 of the wedge 133 of the next (upstream) bucket 101 can engage the foil up article C that is adjacent the first foil down article C in the lane 163a. As the buckets 101 continue to move in the machine direction, these two wedges 133 move through the gaps 169 of the guides 165 of the lane 163a so that the two articles C at the end of the first lane 163a are trapped between the wedges 133 to form the first row of articles C. The angled portion of one of the guides 165 can push the first row of articles C farther into the receiving space 190 as the buckets 101 move past the first lane 163a. In one embodiment, the articles C can slide over the slots 153 in the base 121 as they are pushed into the receiving space 190 with the fingers 127a, 127b, 127c in the retracted configuration.

In the illustrated embodiment, two articles C (e.g., a foil up article followed by a foil down article) at the end of the second lane 163b can be captured between the two wedges 133 as they move through the second lane 163b. The angled portion of the guide 165 at the downstream side of the lane 163b can push the articles C from the second lane 163b into the receiving space 190 as the buckets 101 move in the machine direction M to form the second row of articles C, and the second row can push the articles C in the first row farther into the receiving space 190. Similarly, the wedges 133 can move through the third lane 163c to capture two end articles C (e.g., a foil down article followed by a foil up article) to form the third row of articles C. The angled portion of the final guide 165 can further push the articles C into the receiving space 190 to fully load the articles C into the receiving space 190.

In the illustrated embodiment, the buckets 101 can move downstream from the article conveyor 109 so that the loading side of the buckets 101 is closed by the guide rail 171. Accordingly, the guide rail 171 can cooperate with the translation plate 125 and the sidewall 123 to enclose the receiving space 190 with the wedges 133 moving through the gap 175 of the guide rail 171 (FIG. 4). With the articles C loaded in the bucket 101, the protrusions 157 of the fingers 127a, 127b, 127c can engage the respective cam surfaces 177a, 177b, 177c so that the protrusions 157 slide upwardly along the sloped surface portions 179 to the horizontal surface portions 181 to move the fingers 127a, 127b, 127c upwardly against their biases to the elevated configuration (e.g., as shown in FIGS. 6 and 7). Accordingly, the tops 159 of the fingers 127a, 127b, 127c move upwardly through the slots 153 to extend above the top surface 161 of the base 121, thereby pushing upwardly on the bottoms of the foil up articles C. As shown in FIG. 5, the foil up articles are then elevated with respect to the foil down articles C, which remain in contact with the base 121.

Accordingly, as shown in FIG. 5, the rims R of the elevated foil up articles C are spaced above the bottoms B of the foil down articles, and the rims R of the foil down articles C are spaced below the bottoms B of the elevated foil up articles C. In addition, the sloped sides S of the adjacent articles C can allow narrower portions of the articles to be aligned. As the buckets 101 continue to move in the machine direction M, the cam follower 144 can move past the downstream end of the transverse reset cam surface 203, which was retaining the translation plate 125 in the loading configuration 142a, and can engage the sloped portion 185 of the translating cam surface 183 to move the cam follower 144 in the transverse direction that is transverse to the machine direction M to the vertical surface portion 187 of the translating cam surface 183. This movement of the cam follower 144 can move the translation plate 125 via the extension 146 from the loading configuration 142a to the compacting configuration 142b, wherein the translation plate 125 moves on the pivot arms 141 away from the sidewall 123 to which it is connected. In one embodiment, the translation plate 125 can move on the pivot arms 141 toward the guide rail 171 and the sidewall 123 of the upstream bucket 101 (e.g., diagonally into the receiving space 190). This movement of the translation plate 125 can compact the arrangement of the articles C between the translation plate 125 of the bucket 101, the guide rail 171, and the sidewall 123 of the upstream bucket 101. The articles C can then engage one another at the sloped sides as shown in FIG. 5, limiting or removing any slack or freedom of movement between the arranged articles C. The protrusions 157 and the cam follower 144 can continue to move along the cam surfaces 177a, 177b, 177c, 183 to retain the arrangement of the articles C in the compacted configuration as the buckets 101 move in the machine direction M and are in engagement with the cam assembly 111.

In one embodiment, a robot arm or other suitable apparatus (not shown) can engage the articles C (e.g., by vacuum cups or other suitable apparatus via open tops of the buckets 101) while they are in the compacted configuration and remove the articles from the interior space 190 to be loaded into a carton (not shown). Subsequently, the bucket 101 can move to the downstream end 105 and the cam follower 144 and the protrusions 157 of the fingers 127a, 127b, 127c can move past the downstream ends of the cam surfaces 183, 177a, 177b, 177c. The bucket 101 can be returned to the upstream end 103 by the conveyor to continue the loading and compacting of the articles C. The articles C could be otherwise loaded and/or compacted without departing from the disclosure.

In one embodiment, the compacting of the articles C in the 2×3 arrangement can allow the arrangement to be more reliably acquired by the robot arm since there is less room for the articles C to move relative to one another in the arrangement when the articles are compacted. Accordingly, the locations of the articles C are more predictable in the interior space when the arrangement is compacted to limit or remove freedom of movement of the articles relative to one another. Additionally, in one embodiment, the carton into which the articles C are ultimately loaded by the robot arm is configured for holding the articles C in the uncompacted arrangement (e.g., wherein none of the articles is elevated with respect to the other articles) and has an opening that is wider than the footprint of the compacted arrangement of articles C as acquired from the interior space 190 by the robot arm. The compacted arrangement then can more easily fit through the opening and be inserted into the carton than an uncompacted arrangement since the compacted articles are less likely to catch on an edge of the carton as they are loaded into it. After the articles are loaded into the carton, the robot arm can disengage from the articles and the articles can settle in the carton into an uncompacted arrangement in one embodiment.

Figure 12:
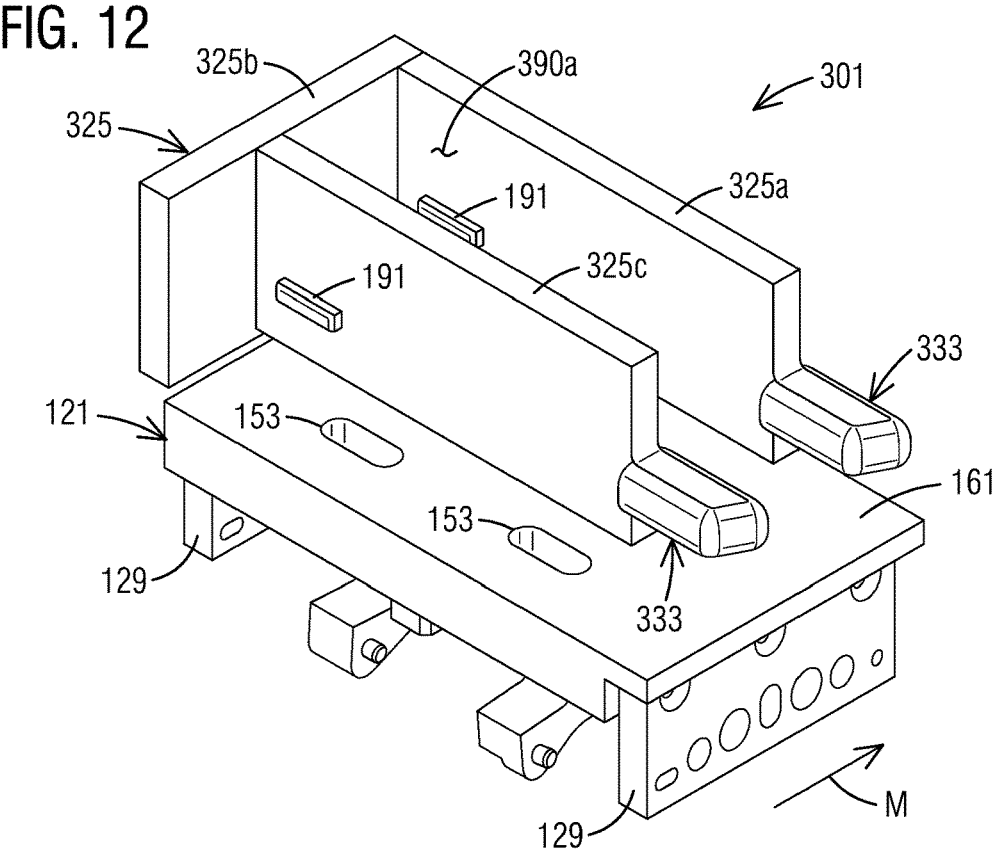
FIGS. 12 and 13 are schematic perspective views of a bucket according to a second exemplary embodiment of the disclosure.
Figure 13:
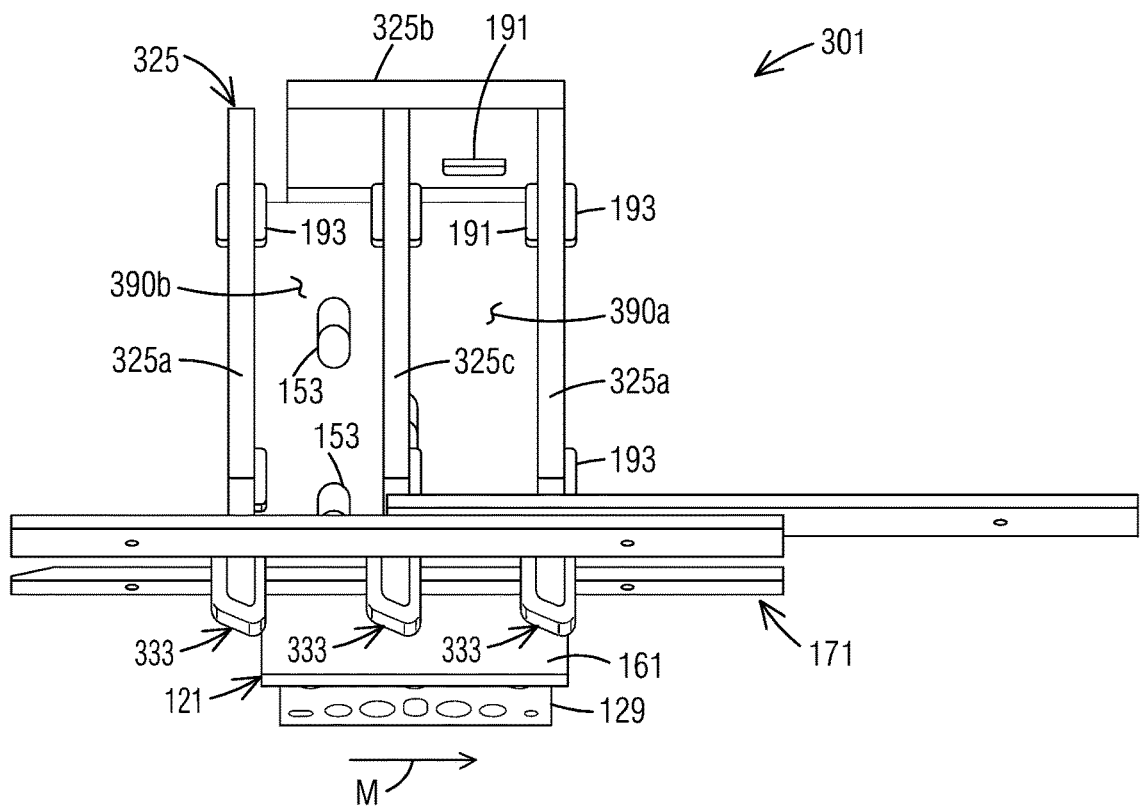

FIGS. 12 and 13 are schematic perspective views of a bucket 301 and two interior spaces 390a, 390b according to a second embodiment of the disclosure. The second embodiment is generally similar to the first embodiment, except for variations noted and variations that will be apparent to one of ordinary skill in the art. Accordingly, similar or identical features of the embodiments have been given like or similar reference numbers. The bucket 301 can be for use in the system 100 or in a similar system. As shown in FIGS. 12 and 13, the bucket 301 can be similar to the buckets 101 of the first embodiment except that the bucket 301 is configured for receiving the articles C in two separate 1×4 arrangements in the two receiving spaces 390a, 390b. For example, the bucket 301 can be configured to be wider than the buckets 101 of the first embodiment in the direction that is transverse to the machine direction so that each of the interior spaces 390a, 390b of the bucket 301 is configured to receive two foil up articles C alternating with two foil down articles C in a single column (e.g., in four rows having one article C each). In one embodiment, the foil up articles C in the receiving space 390b are aligned with the slots 153 for engaging the fingers 127a, 127c. The finger 127b can be omitted and/or deactivated in one embodiment (e.g., the cam surface 177b could be omitted). In an exemplary embodiment, the foil up articles C in the receiving space 390a could be aligned with slots (not shown) for engaging additional figures (not shown). In one embodiment, the foil up articles in the receiving space 390a can be aligned with the foil down articles in the receiving space 390b and the foil down articles in the receiving space 390a can be aligned with the foil up articles in the receiving space 390b. Alternatively, the foil up articles and the foil down articles in the receiving space 390a could be aligned with the respective foil up article and foil down articles in the receiving space 390b.

As shown in FIGS. 12 and 13, the sidewall 123 is omitted in the bucket 301 and the translation plate 325 includes a first portion 325a extending transverse to the machine direction M, a second portion 325b extending in the machine direction M from an end of the first portion 325a, and a third portion 325c extending from the second portion 325b in the transverse direction (e.g., parallel to the first portion 325a). In one embodiment, the first portion 325a and the third portion 325c can cooperate to at least partially form the first receiving space 390a. The third portion 390a further can cooperate with the first portion 325a of the translation plate 325 of an adjacent upstream bucket 301 to at least partially form the second receiving space 390b. An extension and cam follower (not shown) that are similar or identical to the extension 146 and cam follower 144 of the first embodiment can extend from the translation plate 325 through the base 121. The extension and the cam follower can be constrained to move (e.g., due to interaction with the cam surface 183) in the transverse direction since the translation plate 325 is not hinged to a sidewall (e.g., does not need to pivot on a hinge) and since the arrangement of articles includes only one column and the articles are compacted in only the transverse direction. As shown in FIGS. 12 and 13, the wedges 333 can extend from each of the portions 325a, 325c of the translation plate 325 and can operate similarly to the wedges 133 of the first embodiment.

In the second embodiment, the articles C can be loaded into the interior spaces 390a, 390b in a similar manner as in the first embodiment and the foil up articles C can be elevated relative to the foil down articles C by respective fingers in a similar manner as in the first embodiment. In one embodiment, when the bucket 301 moves along the guide rail 171, the translation plate 325 can be moved only in the direction transverse to the machine direction M when the cam follower engages the translating cam surface 183. Accordingly, the translation plate 325 can compact the articles C in the 1×4 configuration in the direction transverse to the machine direction. The bucket 301 and/or the interior spaces 390a, 390b could be omitted or could be otherwise shaped, positioned, arranged, and/or configured without departing from the disclosure.

Any of the features of the various embodiments of the disclosure can be combined with, replaced by, or otherwise configured with other features of other embodiments of the disclosure without departing from the scope of this disclosure.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of arranging articles, the method comprising:
moving a bucket in a machine direction on a conveyor assembly, the bucket comprising a receiving space;
loading a plurality of articles into an arrangement of articles in the receiving space as the bucket moves in the machine direction, the arrangement of articles comprising at least a first article and a second article of the plurality of articles;
elevating at least the first article with respect to the second article in the receiving space of the bucket; and
compacting the arrangement of articles in the bucket.

2. The method of claim 1, wherein the compacting the arrangement of articles comprises moving at least the first article relative to the second article.

3. The method of claim 1, wherein each article of the plurality of articles comprises a rim, a bottom disposed opposite to the rim, and a side that is tapered inwardly from the rim to the bottom.

4. The method of claim 3, wherein the loading the plurality of articles comprises orienting the first article with the rim above the bottom and orienting the second article with the bottom above the rim, the elevating at least the first article comprises positioning at least the rim of the first article higher relative to the bottom of the second article and the bottom of the first article higher relative to the rim of the first article, and the compacting the arrangement of articles comprises moving at least one of the first article and the second article so that the first article and the second article are brought closer together.

5. The method of claim 1, wherein the bucket comprises a base and at least a finger extending at least partially through the base, the elevating at least the first article comprises moving at least a portion of the finger upwardly relative to the base to engage at least a portion of the finger with the first article and to lift the first article with the finger.

6. The method of claim 5, wherein the finger is a first finger, the bucket comprises at least a second finger extending at least partially through the base, the arrangement of articles comprises at least a third article of the plurality of articles, and the method further comprises elevating at least the third article with respect to the second article, the elevating at least the third article comprises moving at least a portion of the second finger upwardly relative to the base to engage at least a portion of the second finger with the third article and to lift the third article with the second finger.

7. The method of claim 5, wherein the finger comprises a base arm that is pivotably connected to the base at a pivot point, the moving at least a portion of the finger upwardly comprises pivoting the finger upwardly about the pivot point.

8. The method of claim 5, wherein the bucket further comprise a translation plate, the compacting the arrangement of articles comprises moving the translation plate to engage and move at least one of the first article and the second article.

9. The method of claim 8, wherein the moving at least a portion of the finger and the moving the translation plate each comprise engaging at least a portion of the respective finger and translation plate with a respective cam surface.

10. The method of claim 1, wherein the bucket comprises a base and a translation plate that cooperate to at least partially form the receiving space in the bucket, the loading the plurality of articles comprises positioning the plurality of articles in the arrangement of articles in the receiving space, and the compacting the arrangement of articles comprises moving the translation plate to engage at least one article in the arrangement of articles in the receiving space.

11. The method of claim 10, wherein the bucket further comprises a sidewall, the translation plate is mounted to the sidewall by at least a hinge, and the moving the translation plate comprises moving the translation plate relative to the sidewall on the hinge.

12. The method of claim 10, wherein the bucket is a first bucket comprising a first sidewall, the method further comprises moving a second bucket in the machine direction on the conveyor assembly with the second bucket being adjacent the first bucket, the second bucket comprises a second sidewall, the second sidewall cooperates with the translation plate and the base of the first bucket to at least partially form the receiving space, and the moving the translation plate comprises moving the translation plate relative to the first sidewall and the second sidewall.

13. The method of claim 12, wherein the first bucket comprises a first wedge extending from the first sidewall, the second bucket comprises a second wedge extending from the second sidewall, and the loading the plurality of articles comprises engaging articles of the plurality of articles between the first wedge and the second wedge and moving the articles into the receiving space.

14. The method of claim 12, further comprising moving the plurality of articles toward the conveyor assembly on an article conveyor, wherein the moving the bucket in the machine direction comprises moving the first bucket and the second bucket relative to the article conveyor, the loading the plurality of articles comprises engaging articles of the plurality of articles from the article conveyor between a first wedge extending from the first sidewall and a second wedge extending from the second sidewall during the moving the first bucket and the second bucket relative to the article conveyor.

15. The method of claim 14, wherein a guide rail extends in the machine direction from the article conveyor, and the method further comprises moving the first bucket and the second bucket along the guide rail so that the guide rail cooperates with the translation plate and the second sidewall to at least partially enclose the receiving space.

16. The method of claim 15, wherein the translation plate comprises a first portion extending parallel to the first sidewall and the second sidewall and a second portion extending perpendicular to the first portion, and the moving the translation plate comprises moving the first portion away from the first sidewall and toward the second sidewall and moving the second portion toward the guide rail.

17. The method of claim 10, wherein the translation plate comprises a first portion extending transverse to the machine direction and a second portion extending in the machine direction, and the moving the translation plate comprises moving the first portion in an upstream direction and moving the second portion transverse to the machine direction.

18. The method of claim 1, further comprising moving the plurality of articles toward the conveyor assembly on an article conveyor, wherein the moving the bucket in the machine direction comprises moving the bucket relative to the article conveyor, the loading the plurality of articles comprises moving the plurality of articles from the article conveyor at least partially into the receiving space during the moving the bucket relative to the article conveyor.

19. The method of claim 18, wherein a guide rail extends in the machine direction from the article conveyor, and the method further comprises moving the bucket along the guide rail so that the guide rail at least partially encloses the receiving space.

20. A system for arranging articles, the system comprising:
a bucket mounted on a conveyor assembly, the conveyor assembly moving the bucket in a machine direction, the bucket comprising a receiving space;
an article conveyor loading a plurality of articles in an arrangement of articles in the bucket on the conveyor assembly;
at least one finger mounted on the bucket for elevating at least one article of the plurality of articles in the arrangement of articles; and
a translation plate mounted on the bucket for compacting the arrangement of articles in the bucket.

21. The system of claim 20, wherein the at least one article comprises a first article, the at least one finger engages the first article for elevating the first article relative to a second article of the plurality of articles, and the translation plate engaging at least the first article for moving at least the first article relative to the second article.

22. The system of claim 20, wherein each article of the plurality of articles comprises a rim, a bottom disposed opposite to the rim, and a side that is tapered inwardly from the rim to the bottom.

23. The system of claim 22, wherein the at least one article comprises a first article, the plurality of articles comprises a second article, the first article is oriented in the arrangement of articles with the rim above the bottom, the second article is oriented in the arrangement of articles with the bottom above the rim, and the finger is for elevating at least the first article to position at least the rim of the first article higher relative to the bottom of the second article and the bottom of the first article higher relative to the rim of the first article.

24. The system of claim 20, wherein the bucket comprises a base, the at least one finger extends at least partially through the base, and at least a portion of the finger is for being moved upwardly relative to the base to engage at least a portion of the finger with the at least one article and to lift the at least one article with the finger.

25. The system of claim 24, wherein the at least one finger comprises a first finger and a second finger extending at least partially through the base, the at least one article comprises a first article, the arrangement of articles comprises at least a second article and a third article of the plurality of articles, the first finger and the second finger are for engaging and elevating the respective first article and third article with respect to the second article.

26. The system of claim 24, wherein the at least one finger comprises a base arm that is pivotably connected to the base at a pivot point.

27. The system of claim 26, wherein at least a portion of the base arm engages a cam surface for pivoting the at least one finger about the pivot point to move at least a portion of the at least one finger upwardly above the base.

28. The system of claim 27, wherein the cam surface is a first cam surface, an extension extends from the translation plate, a cam follower is mounted to the extension, and the cam follower engages a second cam surface for moving the translation plate relative to the base to compact the arrangement of articles.

29. The system of claim 24, wherein the base and the translation plate cooperate to at least partially form the receiving space in the bucket, the plurality of articles in the arrangement of articles is positioned in the receiving space, and the translation plate is for being moved to engage the at least one article in the arrangement of articles in the receiving space.

30. The system of claim 29, further comprising a sidewall mounted to the base, wherein the translation plate is mounted to the sidewall by at least a hinge, and the translation plate is movable relative to the sidewall on the hinge.

31. The system of claim 29, wherein the bucket is a first bucket comprising a first sidewall mounted to the base, the system comprises a second bucket mounted on the conveyor assembly adjacent the first bucket, the second bucket comprises a second sidewall, the second sidewall cooperates with the translation plate and the base of the first bucket to at least partially form the receiving space, and the translation plate is movable relative to the first sidewall and the second sidewall.

32. The system of claim 31, wherein the first bucket comprises a first wedge extending from the first sidewall, the second bucket comprises a second wedge extending from the second sidewall, and the first wedge and the second wedge are for guiding the plurality of articles into the receiving space.

33. The system of claim 32, wherein the article conveyor moves the plurality of articles toward the conveyor assembly, and the first wedge and the second wedge are for engaging the articles from the article conveyor and guiding the articles into the receiving space.

34. The system of claim 33, wherein a guide rail extends in the machine direction from the article conveyor, and the guide rail cooperates with the translation plate and the second sidewall to at least partially enclose the receiving space when the bucket is moved along the guide rail.

35. The system of claim 34, wherein the translation plate comprises a first portion extending parallel to the first sidewall and the second sidewall and a second portion extending perpendicular to the first portion, and the first portion is for being away from the first sidewall and toward the second sidewall and the second portion is for being moved toward the guide rail for compacting the arrangement of articles in the receiving space.

36. The system of claim 29, wherein the translation plate comprises a first portion extending transverse to the machine direction and a second portion extending in the machine direction, and the translation plate is movable into the receiving space so that the first portion moves in an upstream direction and the second portion moves transverse to the machine direction.

37. The system of claim 20, wherein a guide rail extends in the machine direction from the article conveyor, and the guide rail at least partially encloses the receiving space when the bucket is moved on the conveyor assembly along the guide rail.

* * * * *